US00RE36833E

United States Patent [19]

Moore et al.

[11] E Patent Number: Re. 36,833

[45] Reissued Date of Patent: Aug. 29, 2000

[54] TEMPERATURE COMPENSATED WIRE-CONDUCTING TUBE AND METHOD OF MANUFACTURE

[75] Inventors: Boyd B. Moore; Moye Wicks, III, both of Houston, Tex.

[73] Assignee: Quick Connectors, Inc.

[21] Appl. No.: 08/601,974

[22] Filed: Feb. 15, 1996

Related U.S. Patent Documents

Reissue of:

[64] Patent No.: 5,122,209
Issued: Jun. 16, 1992
Appl. No.: 07/664,514
Filed: Mar. 5, 1991

U.S. Applications:

[63] Continuation of application No. 08/261,224, Jun. 16, 1994, abandoned, which is a continuation of application No. 07/451,909, Dec. 18, 1989, abandoned.

[51] Int. Cl.[7] ..... F16L 11/12; H01B 13/26; H01B 7/20

[52] U.S. Cl. ..... 174/47; 156/54; 156/466; 174/100

[58] Field of Search ..... 174/47, 54; 156/466

[56] References Cited

U.S. PATENT DOCUMENTS

| | | | |
|---|---|---|---|
| 1,523,629 | 1/1925 | Bullock | 175/104 |
| 1,998,826 | 4/1935 | Wentz | 174/29 |
| 2,018,477 | 10/1935 | Wentz | 174/29 |
| 2,357,906 | 9/1944 | Osterheld | 338/244 |
| 2,936,357 | 5/1960 | Crawford | 219/609 |
| 2,950,454 | 8/1960 | Unger | 333/242 |
| 3,016,503 | 1/1962 | Pierce | 333/242 |
| 3,265,803 | 8/1966 | Grove | 174/15.7 |
| 3,285,629 | 11/1966 | Cullen et al. | 285/119 |
| 3,356,790 | 12/1967 | Polizzano et al. | 174/102 R |
| 3,436,287 | 4/1969 | Windeler | 156/54 |
| 3,443,429 | 5/1969 | Terwilliger et al. | 73/152 |
| 3,916,685 | 11/1975 | Paap et al. | 73/152 |
| 4,038,519 | 7/1977 | Foucras | 392/472 |
| 4,071,834 | 1/1978 | Comte | 333/242 |
| 4,095,865 | 6/1978 | Denison et al. | 439/191 |
| 4,121,193 | 10/1978 | Denison | 340/855.1 |
| 4,137,762 | 2/1979 | Smith | 73/151 |
| 4,220,381 | 9/1980 | Van Der Graaf | 340/853.7 |
| 4,315,099 | 2/1982 | Gerardot | 174/47 |
| 4,346,256 | 8/1982 | Hubbard et al. | 174/47 |
| 4,368,348 | 1/1983 | Eichelberger | 174/47 |
| 4,415,895 | 11/1983 | Flagg | 340/855.6 |
| 4,416,494 | 11/1983 | Watkins et al. | 439/198 |
| 4,552,432 | 11/1985 | Anderson et al. | 385/101 |
| 4,554,650 | 11/1985 | Brown et al. | 367/154 |
| 4,581,926 | 4/1986 | Moore et al. | 73/155 |
| 4,681,169 | 7/1987 | Brookbank, III | 166/385 |
| 4,693,324 | 9/1987 | Choiniere et al. | 174/47 |
| 4,736,627 | 4/1988 | Wicks, III et al. | 73/155 |
| 4,792,802 | 12/1988 | Meadows | 340/855.1 |
| 4,842,064 | 6/1989 | Gazda | 166/250 |
| 5,080,175 | 1/1992 | Williams | 166/385 |
| 5,140,318 | 8/1992 | Stiner | 340/854.8 |
| 5,234,058 | 8/1993 | Sas-Jaworski et al. | 166/385 |
| 5,294,923 | 3/1994 | Juergens et al. | 340/854.9 |
| 5,329,811 | 7/1994 | Schultz et al. | 73/155 |

*Primary Examiner*—Kristine Kincaid
*Assistant Examiner*—Kamand Cuneo
*Attorney, Agent, or Firm*—Fulbright & Jaworski LLP

[57] ABSTRACT

A method and apparatus for manufacturing a continuous metal tube having a plurality of electrical conductors disposed therein, by using a spring member to depress the electrical conductors while a flat metal strip is formed into a tubular member and welded to enclose the electrical conductors. The spring member functions to protect the electrical conductors from heat damage. The welding occurs completely downstream of the spring member in order to avoid excessive heat buildup in the spring member.

15 Claims, 1 Drawing Sheet

33
31
32
30
24
14
22
13
23
25
12
20
21
11
10

31
30
14
14
13
13
22
12
12
25
21
23
20

21
23
23
31

21
31
23
23

TEMPERATURE COMPENSATED WIRE-CONDUCTING TUBE AND METHOD OF MANUFACTURE

Matter enclosed in heavy brackets [ ] appears in the original patent but forms no part of this reissue specification; matter printed in italics indicates the additions made by reissue.

This *reissue application is a continuation of reissue application Ser. No. 08/261,224, filed Jun. 16, 1994, now abandoned, which is a reissue application for the reissue of U.S. Pat. No. 5,122,209, granted Jun. 16, 1992, which* is a continuation of application Ser. No. 07/451,909, filed Dec. 18, 1989 now abandoned.

BACKGROUND OF THE INVENTION

The present invention relates to an elongated tubular member having electrical conductors disposed therein. The tubular member is capable of transmitting both a fluid medium and electrical power to a remote location. The term elongated is used to refer to tubular members of at least 1000 ft. or more in length with the members being fluid-tight sothat the fluid can be transmitted to the remote location.

The tubular members of the present invention are particularly useful in the steam quality measuring systems disclosed in U.S. Pat. Nos. 4,581,926 and 4,736,627. These patents disclose methods and apparatus for measuring the quality of steam being injected into a subterranean formation to enhance the recovery of heavy crude deposits from the formation. Steam is the most widely used thermal recovery method where it is desirable to heat heavy crude deposits to more efficiently produce them. The patents require both the transmission of electrical power to the measuring apparatus and the transmission of signals from the apparatus. In addition, the apparatus zegulres the transmission of a purge gas to the downhole measuring apparatus to exclude borehole fluids from the apparatus.

The most convenient way to supply both the purge gas and the required electrical conductors is to enclose the electrical conductors in a tubular member that is stored on a suitable reel or drum. Thus, the measuring apparatus can be lowered into the borehole and the tubular member unspooled from the storage drum. This provides a simple means by which a single member can be used to support the measuring apparatus and lower it into the borehole. The tubular member is used to supply both electrical power and purge gas to the instrument. Alternative to this arrangement would be the use of separate electrical conductors and a tubular member. This would require storage on separate reels and the feeding of the electrical conductors and tubular member simultaneously into the borehole. This would be a complicated arrangement, particularly since it is necessary to feed the members through a wellhead lubricating system since the wells must actually be in production to obtain measurements. Since flow measurements are being made, the steam must be continuously injected so the well will remain under pressure. This requires the use of wellhead lubricators to maintain pressure in the well and prevent the escape of steam as the measuring equipment is inserted into the well.

It is, of course, possible to feed electrical conductors through preformed tubular members to provide the required combination of a tubular member and electrical conductor. While this is possible, it is normally not possible to feed the electrical conductors through the length of the tubular member required in well logging operations. Obviously, after transiting a few hundred feet of electrical conductor through the tubular member, the friction between the electrical conductor and the wall of the tubular member would prevent further feeding of the conductors. The use of short-length sections would require the making of numerous connections as the sections are fed into the well. This is time consuming and would increase the probability of an ineffective electrical connection.

In addition to the problem of providing the tubular member with the electrical conductors disposed therein, there is also the problem in thermal injection wells of providing for temperature compensation between the different materials used for the electrical conductors and the tubular member. Normally, injected steam will have a temperature of 400° F. to 500° F. and a pressure of 200 to 600 psi and the tubular member must be capable of withstanding this temperature and pressure. In addition, many wells have a corrosive atmosphere that requires the use of corrosion resistant materials. An obvious choice is the use of one of the alloy steels that are corrosion resistant and have a high strength at elevated temperatures. Obviously, the electrical conductors should be copper to provide good electrical circuits. Since most alloy steels and copper have significantly different coefficients of thermal expansion, some means must be provided for compensating for the greater expansion of the copper conductors in the alloy steel tube. If no means are provided for compensating for the expansion of the copper conductors, the greater length of the conductors will cause them to tend to fall to the bottom of the tubular member as it is lowered into the borehole In extreme cases the conductors could eventually plug the bottom of the tubular member. In addition, it is possible that when the tubular member is withdrawn from the borehole, spooled on the storage drum and allowed to cool to atmospheric conditions, the copper, in cooling, will break some of the conductors due to contraction and the inability of the bunched-up conductors to freely move within the tubular member.

SUMMARY OF THE INVENTION

The present invention solves the above problems by providing a simple means by which a tubular member may be manufactured having the required electrical conductors disposed therein. In addition, the invention disposes the electrical conductors in a position wherein the conductors will remain in position as they elongate due to thermal expansion.

The invention utilizes a continuous flat strip of metal that is formed into a continuous tubular member with the edges of the strip being juxtaposed. The edges of the strip are then welded together to provide a fluid-tight tubular member. In addition, as the flat strip is formed into a tubular member, the electrical conductors are fed into the tube simultaneously with the forming of the tubular member. The invention provides a means by which the electrical conductors may be protected from the damaging heat of the welding operation. It is preferable to use alloy steel for forming the tubular member and a shielded arc welding technique such as tungsten inert gas welding to join the edges together.

Compensation for the difference in the thermal expansion rates of the tubular member and the electrical conductors is provided by properly sizing the tubular member and forming the electrical conductors in the shape of a helix. The inside diameter of the tube is selected sufficiently large to accommodate the helical shape of the electrical conductors. The helical shape of the conductors ensures that they will contact the inner wall of the tubular member. The friction from this contact is sufficient to hold the conductors in position in the tubular member. As the conductors elongate in response to a temperature increase, they will be forced into increased contact with the inner wall of the tubular member. This will increase the friction force that holds the conductors in position. Thus, the conductors will remain in position and not fall to the lower end of the tubular member as it is inserted into the well.

DESCRIPTION OF THE PREFERRED EMBODIMENTS

Figure 1:
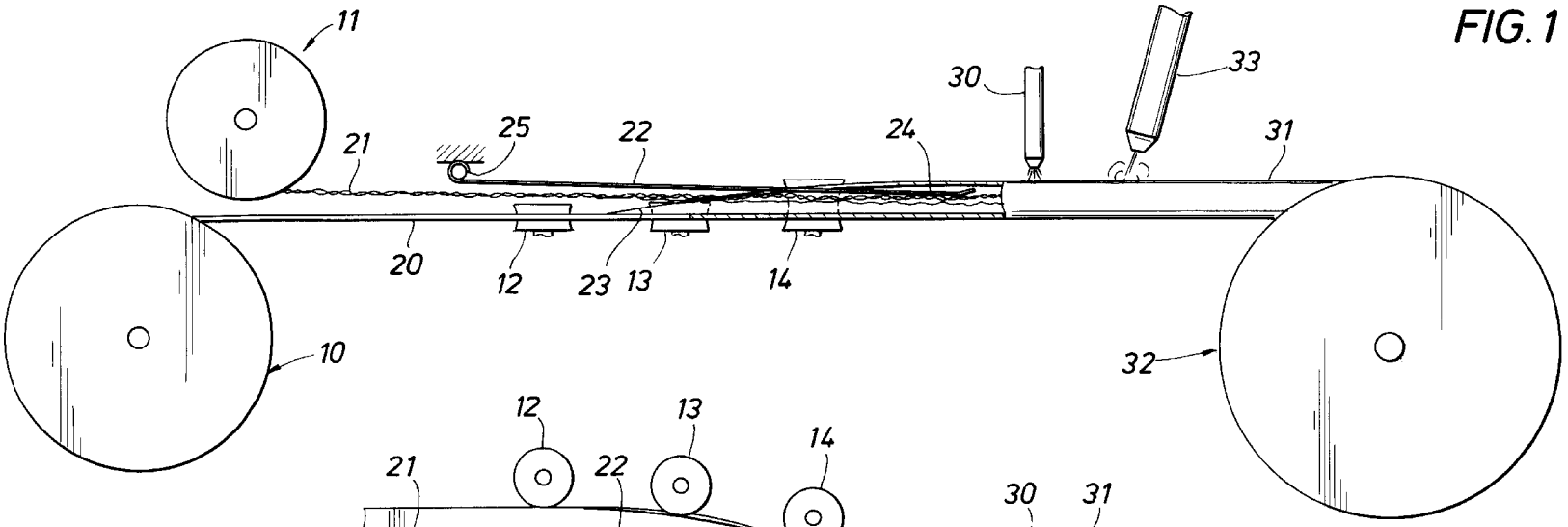
FIG. 1 is an elevation view partly in section of the present invention showing a method of forming the tubular member having electrical conductors disposed therein.
Figure 2:
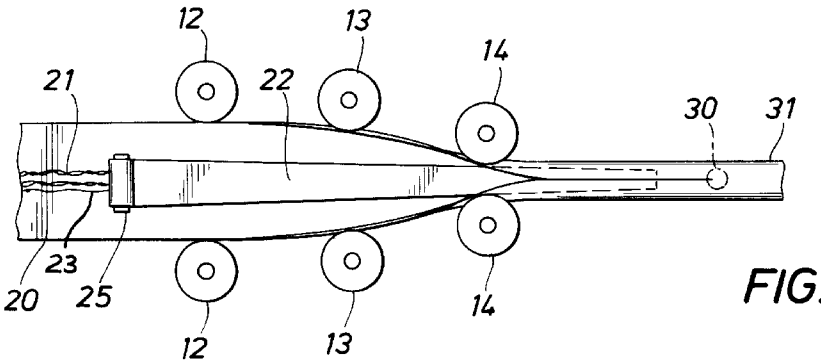
FIG. 2 is a partial plan view of the system shown in FIG. 1.
Figure 4:
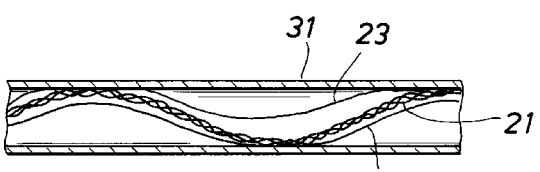
FIG. 4 is an elevation view shown in section of the same tubular member electrical conductor arrangement shown at an elevated temperature.
Figure 3:
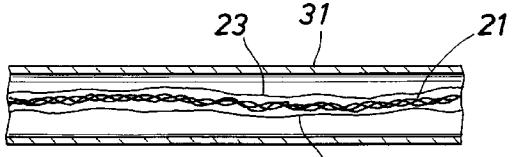
FIG. 3 is an elevation view shown in section of the tubular member electrical conductor arrangement at normal atmospheric temperatures.

Referring now to FIGS. 1 and 2 there is shown a method and apparatus for continuously forming the tubular member and inserting the electrical conductors therein. In particular, there is shown two reels 10 and 11 for storing the required lengths of the strip material from which the tubular member is formed and the electrical conductors. While any desired material may be used for forming the tubular member, it is preferred that it be a corrosion-resistant material having relatively high strength at the elevated temperatures encountered in thermal injection wells. A suitable material is a stainless steel sold under the trade name of INCOLOY 8250®, a tradename of International Nickel Company, Inc. The electrical conductors are shown as comprising two three-wire twisted assemblies 21 plug five single wires 23. Only one of two three-wire conductors and two of the single conductors are shown in FIGS. 3 and 4 for clarity. The strip material 20 is fed through a series of rollers 12, 13 and 14 which bend and roll the flat strip material into a tubular member 31. At the same time that the strip is being formed into a tubular member, the twisted conductors 21 and straight conductors 23 are fed into the tubular member. The completed tubular member 31 with the electrical conductors installed is reeled or stored on a drum 32.

As the conductors are uncoiled from the reel 11, the conductors will retain a coiled shape. The retained shape will cause the conductors to assume a helical shape as they are inserted into the tubular member. The exact size of the coil is not critical although some coiling of the wire is necessary.

The juxtaposed edges of the strip 20 are welded by means of a shielded gas welding mechanism 30. In the preferred embodiment, a tungsten inert gas welding system is used to continually weld the juxtaposed edges to provide a fluid-tight tubular member. To protect the twisted pairs of conductors from damage from the welding operation, a tapered spring steel member 22 is positioned so that one end 24 extends into the tubular member to within 1"–2" upstream of the welding station 30. The taper of the spring steel member 22 conforms loosely to the shape of the tubular member as it is formed by the rollers 12, 13 and 14. The opposite end of the spring steel member 22 is fixedly attached to a suitable support 25. The spring steel member serves to depress the electrical conductors and ensure that they are positioned at the bottom of the tubular member as it passes under the welding station 30. The spring steel member 22 partially shields the electrical conductors from the direct heat of the welding operation.

In addition to utilizing the spring steel strip 22 to maintain the conductors outside the field of the welding operation, it is also desirable to provide some means for cooling the tubular member after the welding operation. Normally, the tubular member can be cooled by spraying with water or similar cooling medium 33 immediately after the welding operation to cool it and prevent heat buildup in the completed tubular member. Obviously, any excessive heat buildup in the tubular member would destroy the electrical conductors disposed in the member.

From the above description it can be seen that the present invention provides a means by which a continuous length of a tubular member may be fabricated while installing electrical conductors therein. This is accomplished by forming the tubular member from a thin strip of material and inserting the electrical conductors as the tube is formed. The tube is sealed by welding the juxtaposed edges while protecting the conductors from damage during the welding operation. While the method can be adapted to any size tubular member, in the present instance the tubular member was provided with a 0.375-inch O.D. and a wall thickness of 0.049". Similarly, the electrical conductors comprised eleven 22-gauge copper wires which were provided with tetrafluoroethylene polymer insulation that is capable of withstanding temperatures of at least 500° F. The eleven wires are disposed in two twisted groups, each containing three wires and five individual wires.

Referring now to FIGS. 3 and 4, there is shown the electrical conductors at atmospheric temperatures and elevated temperatures, respectively. In FIG. 3, the twisted electrical conductors 21 and single conductors 23 are positioned randomly within the interior of the tubular member and the individual loops of the twisted triads are of relatively small diameter while the single conductors are relatively straight. In contrast, in FIG. 4, at elevated temperatures, the individual loops of the twisted triads have expanded in diameter and tend to interfere with the motion of adjacent conductive wires. In addition, some of the loops in the triads and loops in the single conductors contact the interior wall of the tubular member and prevent the conductors from moving. Interference between the triads and the interior wall provides sufficient friction to hold the electrical conductors in place and prevent them from dropping to the bottom of the tubular member as it is inserted into a thermal injection well. When the tubular member is withdrawn from the well and stored on a suitable storage drum, the electrical conductors can contract or shorten in dimension as they cool without causing breakage of the conductors due to their inability to move within the tubular member.

What is claimed is:

1. A method for manufacturing a continuous metal tube having electrical conductors disposed within the tube, said method comprising:

feeding a continuous strip of flat metal into a tube-forming station;

feeding continuous multiple electrical conductors into said tube-forming station, at least some of the conductors being twisted upon themselves to form unitary twisted bundles and the remainder of the conductors being left in an untwisted condition;

forming said strip of first metal into a tubular member with the edges of said strip being aligned and substantially in contact;

depressing said electrical conductors to the side of the formed tubular member opposite the aligned edges to protect said conductors from heat damage; and continuously welding the aligned edges together to provide a continuous tubular member.

2. The method of claim 1 including utilizing a corrosion resistant alloy steel as said metal.

3. The method of claim 1 including surrounding at least the portion of the tubular member being welded with an inert gas.

4. The method of claim 1 including using carbon steel as the metal.

5. The method of claim 1 including providing a sufficient length of each twisted bundle of wires so that at least a portion of each bundle of wires contacts another twisted bundle or the interior wall of the tube.

*6. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position; and*

*d) wherein the conduit is formed of a continuous strip of metal, the metal being formed in a tubular shape with juxtaposed edges welded so as to provide a fluid tight conduit.*

*7. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position; and*

*d) wherein the conduit is formed of a corrosion-resistant metal having relatively high strength at temperatures greater than 400° F.*

*8. The wire-conducting tube of claim 7, wherein the corrosion-resistant metal includes stainless steel.*

*9. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position;*

*d) amd further including a plurality of insulated conductor wires extending through the conduit, said plurality of wires being in substantially continuous contact with the inner surface of the conduit; and*

*e) wherein the plurality of wires includes eleven 22-gauge wires positioned in two twisted groups containing three wires each and five wires remaining free.*

*10. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for*

*positioning the conduit in a downhole application for transmitting electricity through the conduit wire, with the wire maintaining itself in position in the conduit when the conduit is in a substantially vertical downhole position; and*

*d) wherein the conduit has a 0.375 inch O.D. and a wall thickness of 0.049 inch.*

*11. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position; and*

*d) wherein friction between the outer surface of the insulated conductor wire and the inner surface of the conduit maintains the insulated conductor wire in position in the conduit when the conduit is in a substantially vertical downhole position.*

*12. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position; and*

*d) wherein the annular space is filled with a purge gas.*

*13. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position; and*

*d) wherein the conduit is formed of a first material and the insulated conductor wire is formed of a second material, and wherein said second material expands at a faster rate than said first material with rising temperature.*

*14. The wire-conducting tube of claim 13, wherein said first material includes stainless steel and said second material is copper.*

*15. A wire-conducting tube formed of an improved combination of a tubular conduit and electrical conductor wire for transmission of electricity to a remote location, comprising:*

*a) an elongated tubular conduit formed of metal having an inner surface and an inner diameter;*

*b) at least one insulated conductor wire having an outer surface and extending through the conduit, the wire having a permanent helical shape such that the outer surface of the insulated conductor wire is in substantially continuous contact with the inner surface of the conduit, the insulated conductor wire having an outside diameter, wherein said conduit inner diameter is greater than said conductor wire outside diameter such that an annular space is formed between the insulated conductor wire and said conduit inner surface, said annular space being devoid of a solid material where said helical shape of the insulated conductor wire can expand and contract in response to temperature changes;*

*c) the conduit for storing on a drum and having enough flexibility to be stored on said drum and unwound for positioning the conduit in a downhole application for transmitting electricity through the conduit wire, with the wire maintaining itself in position in the conduit when the conduit is in a substantially vertical downhole position; and*

*d) wherein said tubular conduit has a length of at least 1,000 feet.*

* * * * *